US008874406B2

(12) United States Patent
Røtvold et al.

(10) Patent No.: US 8,874,406 B2
(45) Date of Patent: Oct. 28, 2014

(54) OPTICAL MEASUREMENT SYSTEM

(75) Inventors: Øyvind Røtvold, Asker (NO); Knut Åmdal, Baerums Verk (NO); Harald Suphellen, Lierskogen (NO)

(73) Assignee: Metronor AS, Nesbru (NO)

( * ) Notice: Subject to any disclaimer, the term of this patent is extended or adjusted under 35 U.S.C. 154(b) by 651 days.

(21) Appl. No.: 13/088,123

(22) Filed: Apr. 15, 2011

(65) Prior Publication Data
US 2012/0065928 A1 Mar. 15, 2012

(30) Foreign Application Priority Data

Apr. 22, 2010 (EP) .................................... 10004264

(51) Int. Cl.
*G06T 7/00* (2006.01)
(Continued)

(52) U.S. Cl.
CPC ............ *G01B 11/002* (2013.01); *G01B 11/005* (2013.01); *G06F 15/00* (2013.01);
(Continued)

(58) Field of Classification Search
CPC .... G01B 11/00; G01B 11/002; G01B 11/005; G01B 11/24; G01B 11/245; G01C 11/00; G01C 11/02; G01D 7/00; G01D 9/00; G01D 21/00; G01S 3/00; G01S 3/78; G01S 5/00; G01S 5/16; G01S 5/163; G01S 17/00; G01S 17/02; G01S 17/06; G01S 17/42; G01S 2005/00; G06F 11/00; G06F 11/30; G06F 11/32; G06F 11/34; G06F 15/00; G06F 17/00; G06F 17/40; G06F 19/00; G06F 15/16; G06F 17/10; G06T 7/00; G06T 7/004; G06T 7/0042; G06T 2007/00; G06T 2207/10; G06T 2207/10004; G06T 2207/10012; G06T 2207/30; G06T 2207/30108; G06T 2207/30164; G06T 2207/30204
USPC ........... 33/501, 503, 504, 556, 557, 558, 559, 33/560, 561; 73/1.01, 1.79, 1.81, 432.1, 73/865.8, 865.9, 866.3; 181/125; 250/200, 250/559.01, 559.29, 559.31, 559.37, 250/559.38; 342/118, 126, 147, 350, 450, 342/451, 458; 356/3.01, 3.1, 3.11, 3.12, 356/3.13, 3.14, 3.15, 3.16, 4.01, 4.03, 614; 367/87, 99, 118; 382/100, 103, 106, 382/181, 190, 195, 201, 203, 204; 702/1, 702/127, 150, 151, 152, 153, 154, 155, 158, 702/159, 187, 189; 708/100, 105, 200
See application file for complete search history.

(56) References Cited

U.S. PATENT DOCUMENTS 2,414,566 A * 1/1947 Thomas .......................... 33/285
3,393,321 A * 7/1968 Frungel ......................... 250/206
(Continued)

FOREIGN PATENT DOCUMENTS

DE 195 36 294 A1 4/1997
EP 0607303 B1 * 7/1996
(Continued)

OTHER PUBLICATIONS

U.S. Appl. No. 13/655,658, Office Action mailed Aug. 29, 2014, 14 pages.

*Primary Examiner* — Edward Cosimano
(74) *Attorney, Agent, or Firm* — Kilpatrick Townsend & Stockton LLP

(57) ABSTRACT

A system for measurement of spatial coordinates and/or orientation of a probe, comprising a first spatial direction sensor associated with a pattern of targets with known positions relative to each other and to the first spatial direction sensor, a second spatial direction sensor, and processing means for the computation of the orientation and/or spatial coordinates of the pattern of targets relative to the second spatial direction sensor based on the known positions of the targets relative to each other and a determination of the spatial directions of the targets with respect to the second spatial direction sensor, wherein at least three of the targets are in the field of view (FOV2) of the second spatial direction sensor irrespective of the orientation of the pattern of targets and wherein the first spatial direction sensor determines the spatial coordinates and/or orientation of the probe.

11 Claims, 7 Drawing Sheets

(51) Int. Cl.
  *G01B 11/00* (2006.01)
  *G06F 17/40* (2006.01)
  *G06F 15/00* (2006.01)
  *G06F 19/00* (2011.01)
  *G01B 11/245* (2006.01)
  *G01S 5/16* (2006.01)
(52) U.S. Cl.
  CPC ............... *G06F 17/40* (2013.01); *G06F 19/00* (2013.01); *G01B 11/245* (2013.01); *G01S 5/163* (2013.01); *G06T 7/0042* (2013.01); *G06T 2207/10012* (2013.01); *G06T 2207/30164* (2013.01); *G06T 2207/30204* (2013.01)
  USPC ............. 702/150; 33/503; 33/504; 73/865.8; 356/4.03; 702/152; 702/187; 702/189; 708/200

(56) References Cited

U.S. PATENT DOCUMENTS

| | | | | |
|---|---|---|---|---|
| 3,453,047 | A | * | 7/1969 | Olson et al. .................. 356/4.03 |
| 5,440,392 | A | * | 8/1995 | Pettersen ...................... 356/620 |
| 5,973,788 | A | | 10/1999 | Pettersen |
| 6,310,644 | B1 | | 10/2001 | Keightley |
| 6,405,072 | B1 | | 6/2002 | Cosman |
| 2010/0017178 | A1 | | 1/2010 | Tsuk et al. |

FOREIGN PATENT DOCUMENTS

| | | | |
|---|---|---|---|
| EP | 2381214 A1 | * | 10/2011 |
| FR | 2 870 594 A1 | | 6/2004 |

* cited by examiner

OPTICAL MEASUREMENT SYSTEM

CROSS-REFERENCE TO RELATED APPLICATIONS

This application claims the benefit of foreign priority to European Patent Office (EPO) Application EP10004264.7, filed on Apr. 22, 2010.

BACKGROUND OF THE INVENTION

The present invention relates to an optical measurement system for measuring spatial coordinates and/or orientation of a probe or probing system.

From EP 0 607 303 B1, an opto-electronic system for point-by-point measurement of spatial coordinates is known. The system described provides a probe comprising a minimum of three light sources at known coordinates relative to a local probe fixed coordinate system and with a touch point at a known location relative to said local coordinate system is brought into contact with the point for which the spatial coordinates are to be determined. An opto-electronic spatial direction sensor determines the angles in two dimensions (spatial direction) towards the light sources. Based on the known positions of the minimum three light sources and the touch point in the local probe fixed coordinate system with respect to each other and based on the determined spatial directions of the individual light sources and the spatial direction sensor, the system can deduce by photogrammetric calculation methods the position and orientation of the probe and therefore the spatial coordinates of the touch point.

BRIEF SUMMARY OF THE INVENTION

Compared to optical measurement systems of the prior art, the present invention provides unlimited or spherical field of view in combination with a variety of probes and probing systems. The present invention therefore provides a new level of flexibility in terms of measurement tasks that can be handled with a single system compared to the prior art. This provides significant operational and investment advantages in industries such as aerospace, automotive and other industries manufacturing complex assembled products.

It is the object of the present invention to overcome shortcomings of the prior art and to present a system which provides a highly accurate measurement of spatial coordinates and/or orientation of a probe, which can be used in enclosed setups and where space is limited and which is simple, easy and quick to use.

The present invention encompasses a system for measurement of spatial coordinates, a method for measurement of spatial coordinates, and a computer program for measurement of spatial coordinates. Advantageous embodiments are claimed in the dependent claims.

The inventive system has the advantage that the first spatial direction sensor has associated targets that permit it to be moved and turned around in every spatial direction as long as it stays within the field of view of the second spatial direction sensor. Therefore, the system is highly flexible and provides a 360 degree field of view. The first spatial direction sensor with its associated targets can be freely moved around—either manually or motorized—inside the field of view of the second spatial direction sensor without intermediate alignment to the coordinate system of the object to be measured. The probe has targets that are observed by the first spatial direction sensor, thus enabling the probe to measure anywhere regardless of the orientation and field-of-view of the second spatial direction sensor.

In addition, the system increases accuracy compared to prior art as the large field of view enables the distance from the spatial direction sensors to the targets and the probe to be minimized while avoiding the difficulties associated with extreme wide-angle optics. In addition, the positioning flexibility of the spatial direction sensors enables selection of an optimal setup dependent of the shape and size of the object to be measured.

Furthermore, due to the use of two independent spatial direction sensors, the system is able to look corners and into areas which are not accessible with a single spatial direction sensor.

In an advantageous embodiment, the probe has targets with known positions relative to each other, the processing means is further configured to compute the spatial coordinates and/or orientation of the probe based on the known orientation and/or spatial coordinates of the target, the known positions of the targets of the probe relative to each other and a determination of the spatial directions of the targets of the probe with respect to the first spatial direction sensor and at least three targets of the probe are in the field of view of the first spatial direction sensor.

By having at least three targets of the probe in the field of view of the first spatial direction sensor, the spatial coordinates and/or orientation of the probe can be determined.

In a further advantageous embodiment, the system comprises at least one further probe and/or at least one further first spatial direction sensor and/or at least one further second spatial direction sensor.

Due to this, the accuracy of determining the position and orientation of the first spatial direction sensor is increased by using more than one second spatial directions sensor in positions known relative to each other.

In a further advantageous embodiment, the first spatial direction sensor and its associated target can be rotated.

With this function, the first spatial direction sensor associated with the target is able to view in different directions, such that the spatial coordinates and/or orientation of probes located around the first spatial direction sensor can be determined.

In a further advantageous embodiment, the first spatial direction sensor and the second spatial direction sensor are mechanically connected.

Due to the fact that the second spatial direction sensor and the target with the first spatial direction sensor are mechanically connected, the distance from the second spatial direction sensor to the first spatial direction sensor is known. Therefore, only the orientation of the target of the first spatial direction sensor has to be determined. This significantly reduces the requirements with respect to calculation capacities of the processing means and improves accuracy.

Furthermore, the distance from the second spatial direction sensor to the target of the first spatial direction sensor can be kept short, while still having the possibility of accomplishing all spatial measurements of a system without mechanical or contact measuring. For example, the inventive system can be designed as compact and self-contained unit, which can be placed in a location whose surrounding has to be measured. The alignment in a global coordinate system may then be performed by reference points in the surrounding to be measured (for example reference points on a welding robot on the assembly line).

In a further advantageous embodiment, the mechanical connection is a frame structure consisting mainly of carbon fiber reinforced polymer.

Due to this, the mechanical connection is highly rigid and changes very little in response to changes in temperature. As the distance of the spatial direction sensors is firmly fixed to this rigid structure, all measurements become even more accurate.

In a further advantageous embodiment, at least one reference point is in the fields of view of the second spatial direction sensor and a further second spatial direction sensor and the processing means is further adapted to calibrate the spatial coordinate systems of the second spatial direction sensors based on the respective spatial coordinates of the at least one reference point.

This embodiment of the invention allows that the target moves, leaving the field of view of the second spatial direction sensor and entering in the field of view of a further second spatial direction sensor. As both second spatial direction sensors view the same reference point, their spatial coordinate system can be calibrated and thus melted into one spatial coordinate system, in which the target can move freely. This is especially important in assembly line applications where the target can be put on the product transported by the assembly line.

In a further advantageous embodiment, the target moves from the field of view of the second spatial direction sensor in a field of view of a further second spatial direction sensor, wherein at least one reference point is in the field of view of the first spatial direction sensor before and after the movement and the processing means is further adapted to calibrate the spatial coordinate systems of the second spatial direction sensors based on the respective spatial coordinates of the at least one reference point.

While this embodiment is similar to the preceding embodiment in that the target can be moved around freely, the reference point in this embodiment does not have to be in the fields of view of the second spatial direction sensors. This is advantageous as it is not always easy to find a reference point that is viewed by two second spatial direction sensors at the same time.

BRIEF DESCRIPTION OF THE DRAWINGS

Exemplary embodiments of the invention are described in the following with respect to the figures.

Figure 1:
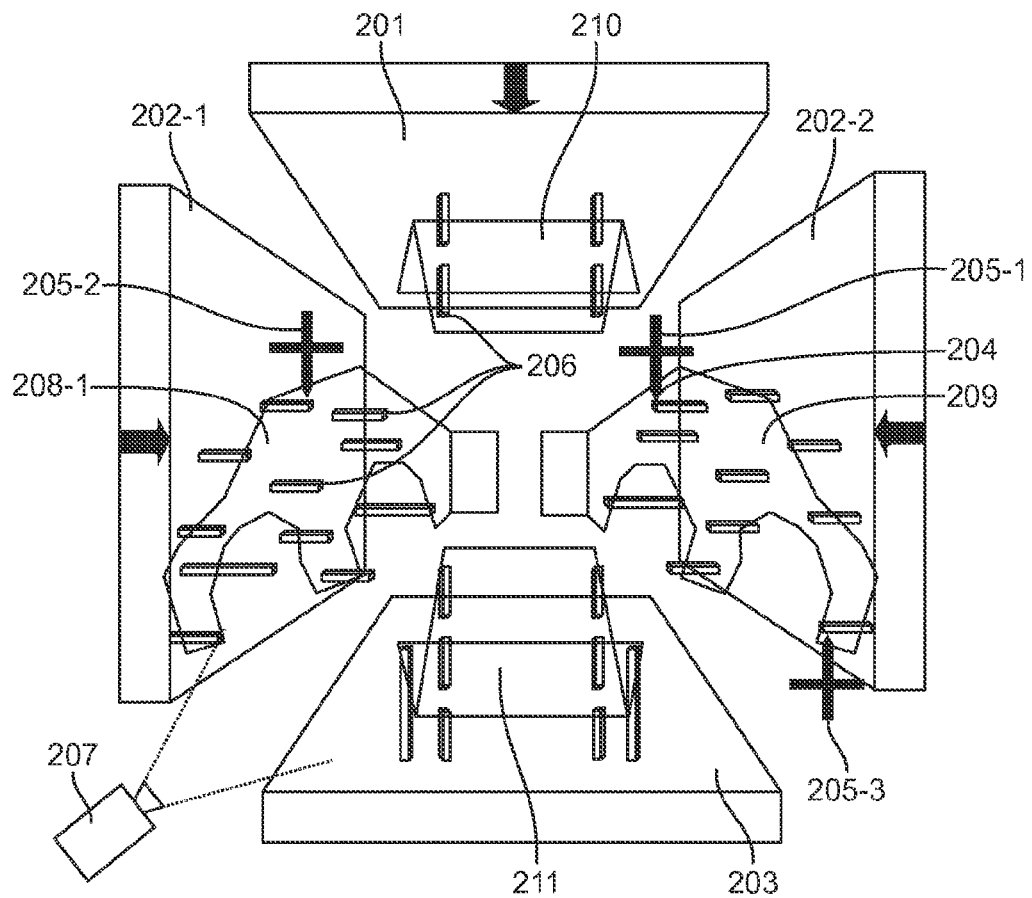
FIG. 1 illustrates a system according to the prior art in an automotive production line framing station.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

There are two main weaknesses with the system described by EP 0 607 303 B1.

Firstly, the accuracy of the measurement is influenced by the ratio of the distance between the opto-electronic spatial direction sensor and the touch probe as well as the distance of the light sources on the touch probe with respect to each other. If the distance between the opto-electronic spatial direction sensor and the touch probe becomes too large, the angles measured by the opto-electronic spatial direction sensor in order to determine the spatial directions decrease to such a degree that accurate measurement is no longer possible.

In order to overcome this problem, the distance of the light sources on the touch probe with respect to each other may be increased, such that the angles become measurable again. However, if the touch probe is inclined with respect to the opto-electronic spatial direction sensor, even increasing the distances would not necessarily increase the measured angles sufficiently.

Also, in many applications, increasing the distance of the light sources on the touch probe with respect to each other is not practical, since the overall size of the touch probe is in practice limited due to the environment in which the system is to be used.

Thus, the measurement accuracy for the system described in EP 0 607 303 B1 deteriorates for longer distances, as the angles measured by the opto-electronic spatial direction sensor in order to determine the spatial directions of the light-sources decrease.

The addition of a second spatial direction sensor placed so that the lines from the two spatial direction sensors intersect at approximately right angles at the light sources can be used to overcome this problem. The accuracy is then improved by triangulation between the spatial direction sensors. Nevertheless, in such systems, the object to be measured must be inside the field of view of both cameras, as must the light sources of the probe.

Secondly, the opto-electronic spatial direction sensor has a finite field of view. For an object of a given size, this dictates the minimum distance between the object and the opto-electronic spatial direction sensor of the system. For large objects, this distance may become too large to achieve the required accuracy.

For other objects, a finite field of view may not be acceptable. As an example, measuring the exact shape of an enclosed space, such as a room to be fitted with a custom parquet floor, or a boiler to be fitted with new pipes, requires a measurement system that can operate through 360 degrees field of view, i.e. a system with unlimited field of view.

A typical example from industry is the so-called 'framing station' or 'framer' in an automotive production line. FIG. 1 schematically illustrates an automotive framer or framing station with roof 201, sides 202-1, 202-2 and floor tooling 203. This is the tool where two side panels 208-1, 209 and a roof panel 210, each held in the corresponding tooling, is aligned and welded to a floor assembly 211. Typically, the overall references or coordinate system definition is found either in external structures, or in the floor tooling 203.

Of critical importance to the overall geometry of the finished vehicle, the framer must be measured in the closed position that is with the tools for each of the sides roof and floor assemblies interlocked while side panels 208-1, 209 and roof panel 210 as well as the floor assembly 211 are not in place. Due to the complexity of the tooling, the closed framer appears as a closed box with all the details to be measured on the inside.

Sheet-metal locating points 206—typically pins and clamps for holding the panels and the floor assembly 211 whose spatial coordinates have to be determined, are measured with a touch point 204 of a first touch probe 205-1. The spatial coordinates of the touch point 204 shall be determined by the above mentioned prior art system. However, the distance between the spatial direction sensor 207 and the first touch probe 205-1 is too long for the spatial coordinates to be measured accurately.

In addition to that, parts of the framer or related equipment may cover a second touch probe 205-2 and a third touch probe 205-3, such that the second touch probe 205-2 and the third touch probe 205-3 are not in the field of view of the spatial direction sensor 207 and, therefore, spatial coordinates of the second touch probe 205-2 and the third touch probe 205-3 cannot be determined.

As typically no position for the spatial direction sensor described in EP 0 607 303 B1 can be found that simultaneously provides both a view of all parts of the framer to be measured and sufficiently short distances to all parts of the framer to provide the required accuracy, this prior art is not adapted for measuring framers. Since framers are a critical part of automotive production lines, this significantly reduces the usefulness and flexibility of systems such as that presented in EP 0 607 303 B1 in the automotive industry and other industries with similar enclosed objects to measure.

In this type of application the two camera approach provides no improvement, rather the need to find two suitable locations for spatial direction sensors while maintaining proper intersection angles makes the problem much more severe.

A number of approaches for expanding the effective field-of-view of a camera are known.

The most obvious is to choose wide-angle or 'fish-eye' optics. While wide-angle optics may increase field-of-view, it is not feasible to achieve an unlimited field-of-view. Additionally, as the field-of-view increases, so do the challenges related to accurately determining and cancelling the effects of lens imperfections—critical in a measurement application.

Using multiple cameras with partially-overlapping fields-of-view is an alternative or even complementary approach. Once the relative position and orientation of the cameras in the cluster of cameras is known, the measurements made with one camera can easily be related to measurements from any other camera, effectively creating a single camera with infinite field-of-view. Unfortunately, this approach also has challenges in practice, including high cost and complexity as well as the reliance on the relative camera positions to remain stable within extremely tight tolerances when subjected to the external influences such as temperature variations, shocks and vibration. An alternative approach would therefore be advantageous.

From FR 2870 594 A1 an approach is known by which a series of cameras form a 'video arm' from an area where the references are observed by the first camera, to the area of interest which is measured by a probe attached to the last camera, thus by passing any obstructions to direct line-of-sight between the references and the area of interest. Each camera in the 'arm' has targets placed upon it, and each camera observes the targets on the previous camera thus calculating its own position relative to the reference marks and thus the coordinate system.

The approach presented is well suited for e.g. aircraft boresighting applications, but presents a number of challenges for general measurement use. For example, in many applications, it is impossible or impractical for all reference marks to be within the field-of-view of the first camera—refer e.g. to the automotive framer presented above where this requirement would dictate long camera-to-object distances thus negating the advantage we are seeking. Also, having a camera associated with the probe is a challenge both regarding weight, fragility and cabling, as the probe is the unit the system operator will be handling during measurement. Perhaps most importantly, the approach lacks the critical element of providing targets viewable from all directions. Therefore, to achieve an infinite field-of-view will require a higher number of cameras than the following will show is necessary, adding cost and complexity both to the system per se and to its operation. At the same time, each additional 'link' in the chain of cameras adds measurement error and thus decreases overall system performance.

Alternative approaches involving the same basic concept of 'cameras viewing camera with targets' are also known from other documents, but none of these provide an electro-optical probing system with an infinite field-of-view capable of measuring a complete enclosed space.

Figure 2:
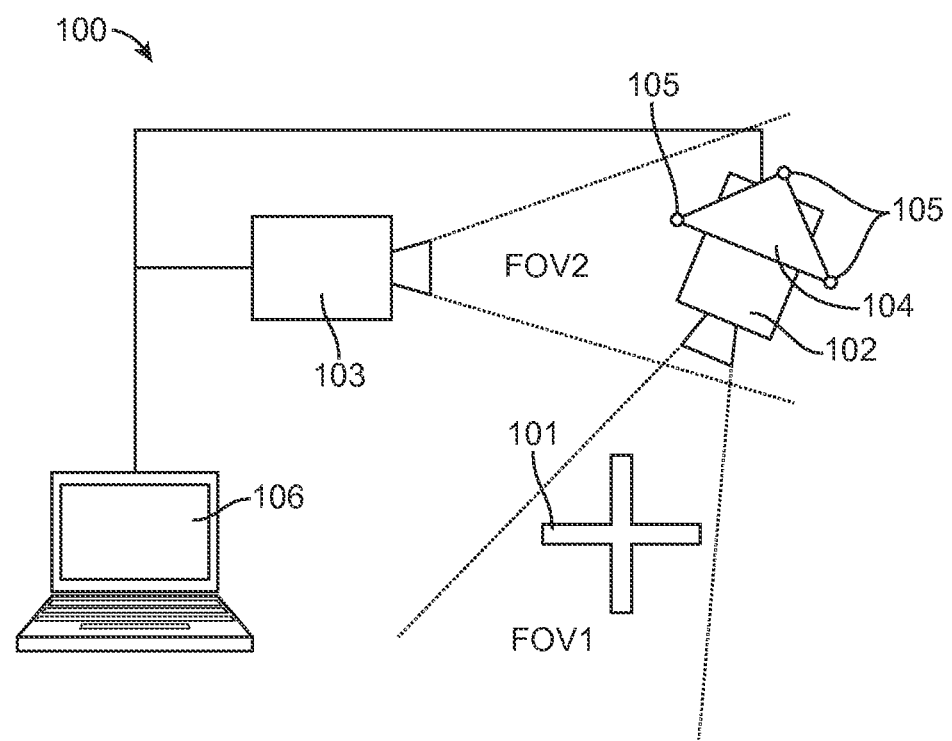
FIG. 2 illustrates a first embodiment of a system according to the present invention.

In FIG. 2, the principle elements of a system 100 according to the invention are illustrated. The system 100 comprises a probe 101 to be measured, a first spatial direction sensor 102, a second spatial direction sensor 103, and a processing means 106.

The probe 101 is situated in the field of view FOV1 of the first spatial direction sensor 102. The first spatial direction sensor 102 is again situated in the field of view FOV2 of the second spatial direction sensor 103. While the second spatial direction sensor 103 determines the position and orientation of the first spatial direction sensor 102, the first spatial direction sensor 102 again determines the position and/or orientation of the probe 101.

In order to determine the position and/or orientation of the probe 101, the second spatial direction sensor 103 determines the spatial directions, i.e. spatial angles or solid angles, relative to targets 105 associated with the first spatial direction sensor 102 arranged in a pattern 104. Hence, the position and/or orientation of the pattern 104 and thus of the first spatial direction sensor 102 can be determined. The first spatial direction sensor 102 again determines the spatial coordinates and/or orientation of the probe 101.

The first spatial direction sensor 102 is free to move and rotate according to all six degrees of freedom in order to observe the probe 101 as long as the second spatial direction sensor 103 remains stationary and at least three targets 105 associated with the first spatial direction sensor 102 remain inside the field of view FOV2 of the sec- and spatial direction sensor 103. This provides a virtually unlimited field of view for the system 100. Therefore, the system is able to look behind corners or through 360 degrees inside an enclosed measurement volume.

For measuring, the first spatial direction sensor 102 is moved and rotated until its field of view FOV1 is pointing in the direction of a probe 101 whose position and/or orientation needs to be determined. The system 100 is able to transform the local coordinate system of the first spatial direction sensor 102 in the coordinate system of the system 100 by determining the spatial directions of at least three targets 105 associated with the first spatial direction sensor with respect to the second spatial direction sensor 103. Hence, the position and/ or orientation of the probe 101, being in the field of view FOV1 of the first spatial direction sensor 102 only, is firstly determined in the local coordinate system of the first spatial direction sensor 102 and then transformed into the position and/or orientation in the coordinate system of the system 100.

The first and second spatial direction sensors 102, 103 are connected to the processing means 106. This connection may be a wired or wireless connection. Therefore, the processing means 106 as well as the first and second spatial direction sensors 102, 103 may be equipped with a transceiver. Also the probe 101 could have a connection to the processing means 106 in the same manner, e.g., to control the targets.

The spatial direction sensors 102, 103 are any type of electro-optical camera such as e.g. a CMOS camera or a CCD camera.

The probe 101 is any type of instrument suitable for measurement of the location of a geometrical entity such as a surface point or a hole—such as e.g. a touch probe with a stylus for point-by-point measurement or a stand-off scanning camera measuring multiple surface points in a so-called patch—and/or a physical characteristic associated with such an entity e.g. a combined sensor for measuring a physical characteristic combined with a location, such as a color temperature probe or ultrasonic thickness probe.

The targets 105 are any type of mark or target suitable for observation by the spatial direction sensors, such as light emitting diodes, fiducial marks, retro-reflective targets or shapes. The targets 105 may be active or passive. As active targets, LEDs (Light Emitting Diodes) are particularly well suited, but any light source with a well-defined spectro-emission may be employed. The passive targets may reflect light from an external active light source.

Figure 3:
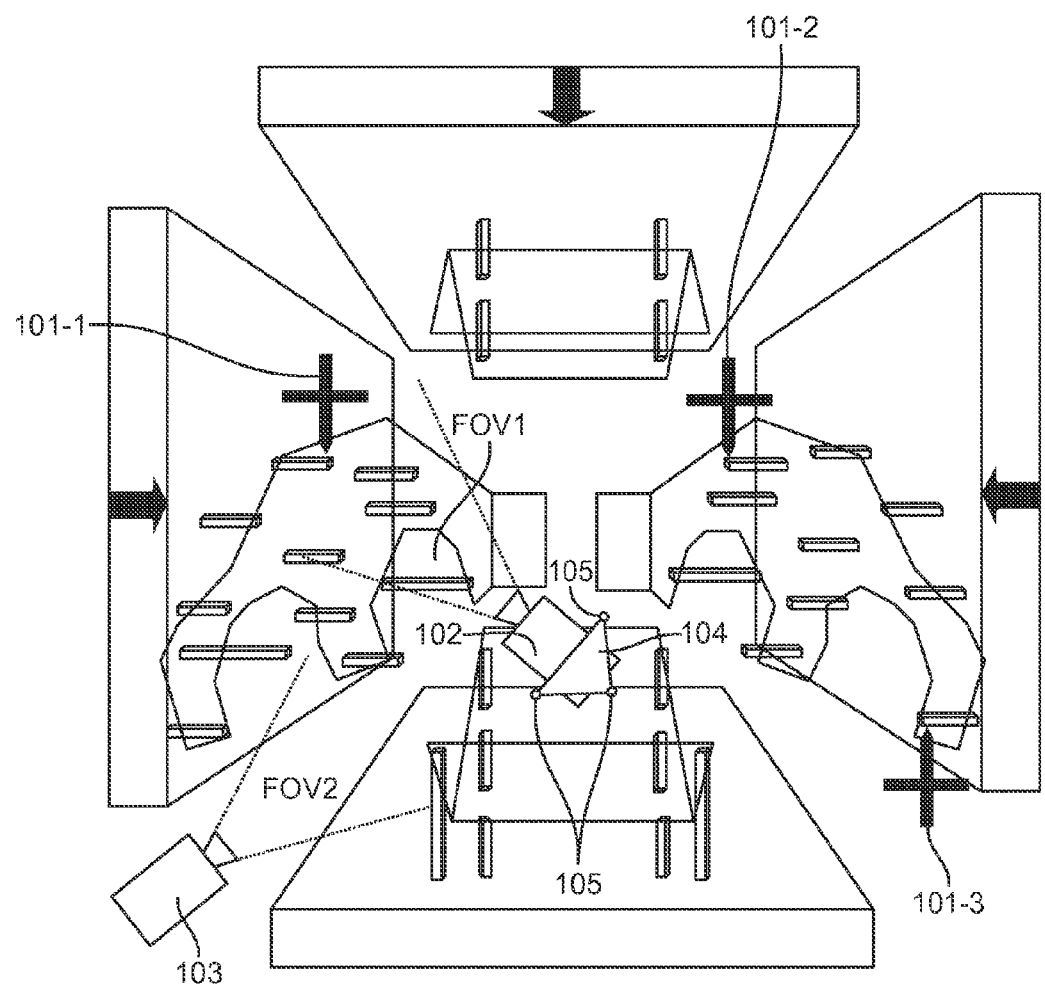
FIG. 3 illustrates the first embodiment of the present invention in an automotive production line framing station application.

FIG. 3 represents an application of the invention according to the first embodiment in an automotive framing station as already illustrated in FIG. 1. In this industrial application, not all of the probes 101-1, 101-2, 101-3 are in the field of view FOV2 of the second spatial direction sensor 103. However, the first spatial direction sensor 102 is arranged in such a manner that it is always in the field of view FOV2 of the second spatial direction sensor 103. The first spatial direction sensor 102 then again detects the position and/or orientation of the probes 101-1, 101-2, 101-3. Therefore, the first spatial direction sensor 102 is mounted in such a way that it can rotate its field of view FOV1 in all directions. The acquired data is transmitted to the processing means 106 that in turn executes a computer program to perform the following steps.

In a first step, the spatial coordinates and/or orientation of the first probe 101-1 is determined in the local coordinate system of the first spatial direction sensor 102. Then, in a second step, the position and/or orientation of the first spatial direction sensor 102 is determined in the coordinate system of the system 100 by the second spatial direction sensor 103. This is done by measuring the spatial directions of at least three targets 105 associated to the first spatial direction sensor 102 arranged in a pattern 104. The local coordinate system of the first spatial direction sensor 102 is then transferred into the spatial coordinate system of the system 100. Hence, also the spatial coordinates and/or orientation of the probe 101-1 are transformed in the coordinate system of the system 100.

Due to the fact that the first direction sensor 102 is able to rotate or even to move, it is able to image the whole space surrounding it, rendering it possible to determine the position and/or orientation of the probes being located around it. Since the first spatial direction sensor 102 is situated in a location which is much closer to the probes 101-1, 101-2, 101-3 to be measured, it is less likely that a welding robot or an element prevents a spatial coordinates and/or orientation measurement. Also, due to the smaller measurement distance for the determination of the position and/or orientation of the probes 101-1, 101-2, 101-3, the measurements become more exact than if the second spatial direction sensor 103 measures the position and/or orientation of the probes 101-1, 101-2, 101-3 directly.

Figure 4:
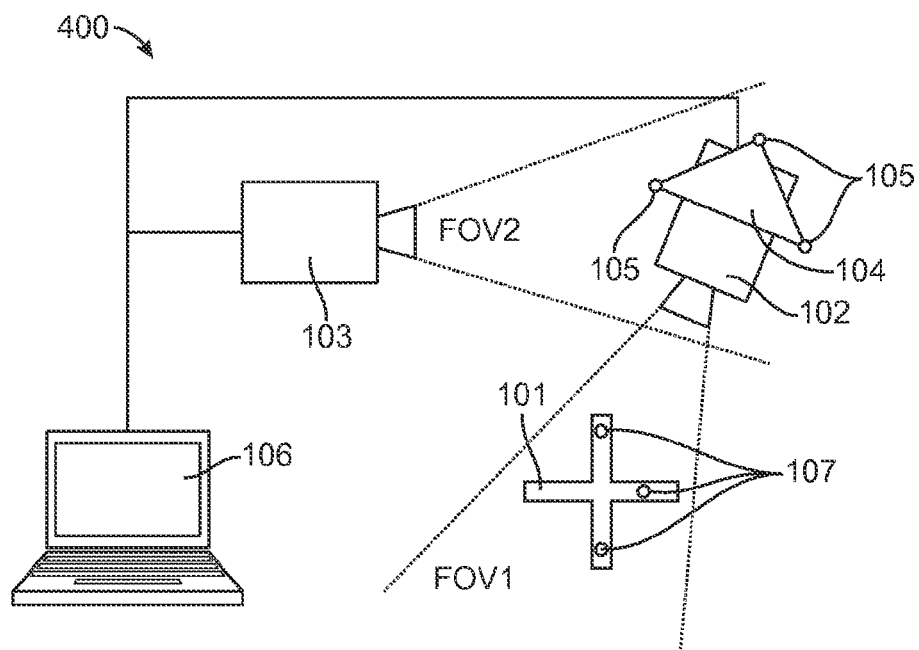
FIG. 4 illustrates a second embodiment of the present invention.

In FIG. 4, a second embodiment of the present invention is illustrated. Additionally to the first embodiment, the probe 101 also comprises targets 107. The spatial coordinates and/or orientation of the probe 101 are then determined based on a measurement of the spatial directions of these targets 107 relative to the first spatial direction sensor 102. In fact, the position of the targets 107 is known in a local coordinate system of the probe 101. Based on this information and the determined spatial directions, the system 400 is able to determine the position and/or orientation of the probe 101 in the local coordinate system of the first spatial direction sensor 102. This position and/or orientation can then be transformed in the position and/or orientation in the coordinate system of the system 400 as explained for the first embodiment.

Figure 5:
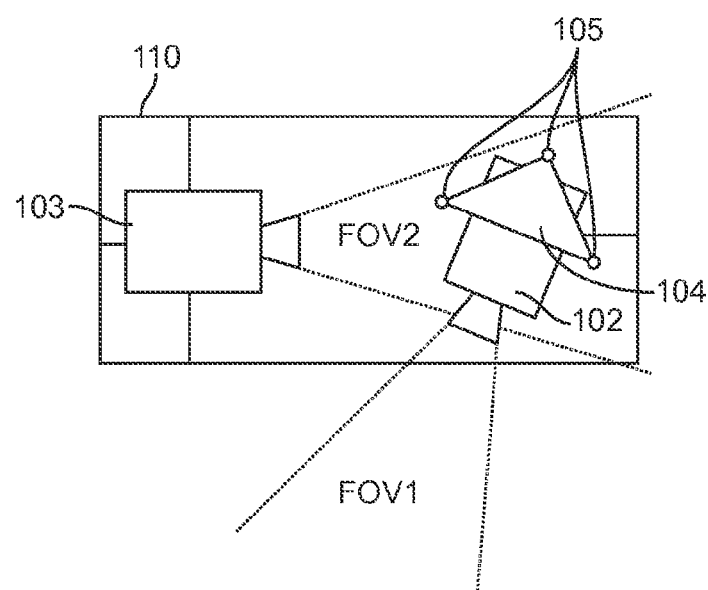
FIG. 5 illustrates a third embodiment of the present invention.

In a third embodiment according to the present invention, illustrated in FIG. 5, the first spatial direction sensor 102 and the second spatial direction sensor 103 are mechanically connected. For example, the spatial direction sensors can be mounted in a frame structure 110. The first spatial direction sensor 102 is mounted in the frame structure 110 in such a way that it can rotate freely. Furthermore, the spatial direction sensors 102, 103 are arranged in such a manner that at least three targets 105 associated to the first spatial direction sensor 102 are always in the field of view FOV2 of the second spatial direction sensor 103, independent of the rotational orientation of the first spatial direction sensor 102.

The frame structure 110 may consist of carbon fiber reinforced polymer or a metal tubing or any other solid and rigid material. Preferably, the material has minimum temperature expansion properties. The entity of first and second spatial direction sensors 102, 103 and the frame structure 110 may form a self-contained, compact and stable unit, which is easy to transport and which resists high external stresses. The spatial direction sensors 102, 103 may also be protected by the frame structure 110. Alternatively, the frame structure 110 is partly covered or the frame structure may even be replaced by a closed construction and form a closed unit.

Figure 6:
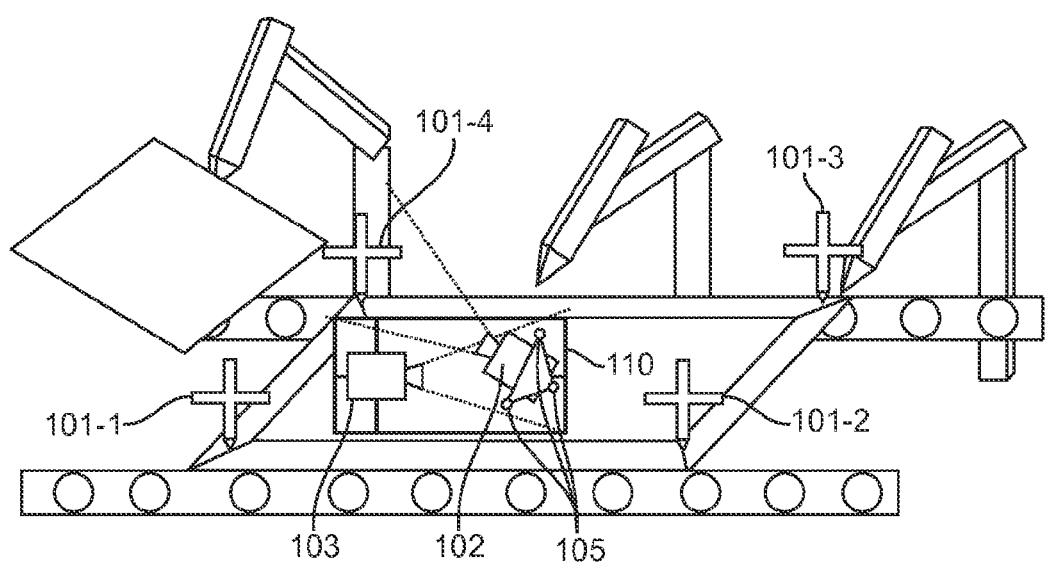
FIG. 6 illustrates the third embodiment of the present invention in a production line application.

FIG. 6 illustrates the third embodiment of the present invention, having probes 101-1, 101-2, 101-3, 101-4, in an exemplary industrial setup in a moving production line. As can be seen, the entity with first and second spatial direction sensors 102, 103 and frame structure 110 can be placed on a tooling pallet or processed product as a self-contained system.

Figure 7:
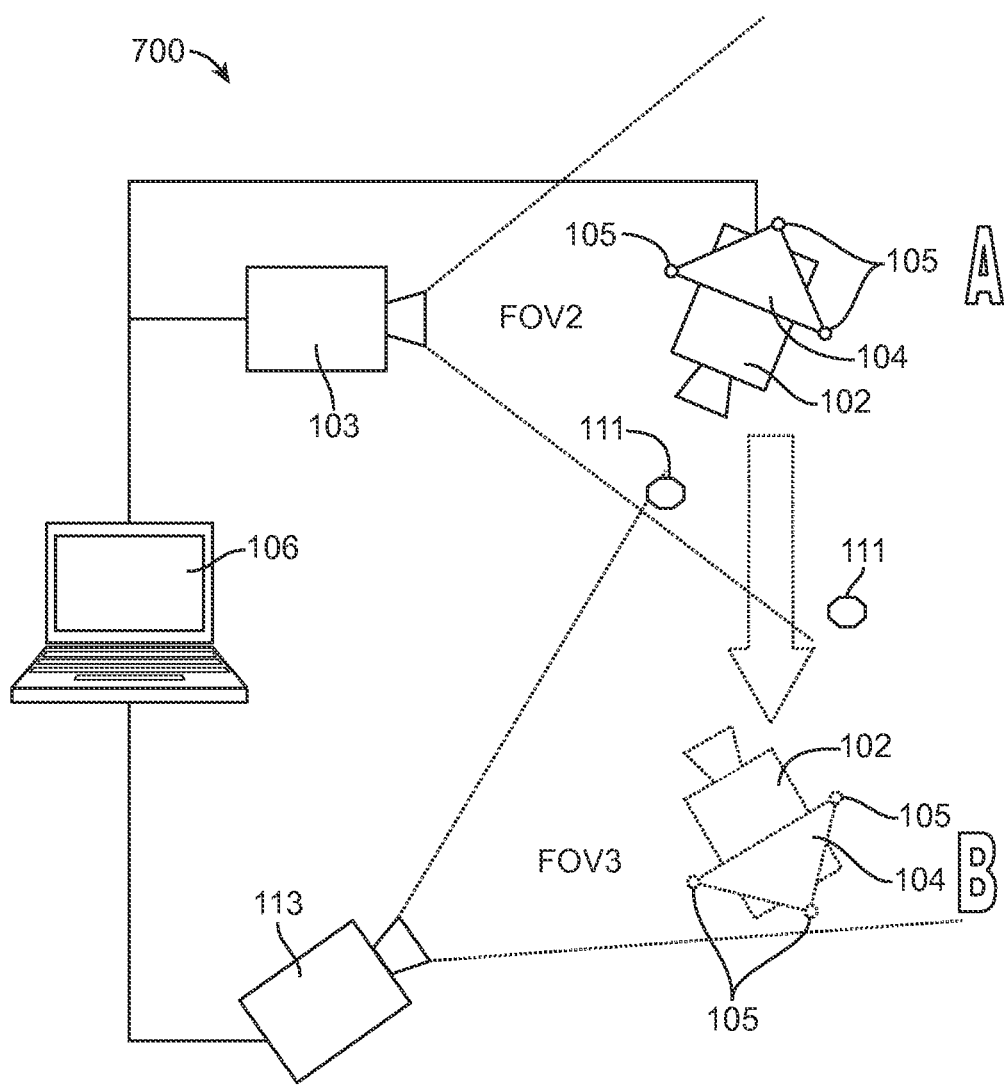
FIG. 7 illustrates a fourth embodiment of the present invention.

FIG. 7 illustrates a fourth embodiment of the present invention. In this embodiment, the system 700 comprises a second spatial direction sensor 103 having a field of view (FOV2) and a third spatial direction sensor 113 having a different field of view FOV3. These two fields of view FOV2 and FOV3, however, have common sectors in which reference points 111 are situated. By means of these reference points 111, which also may have targets, the local coordinate systems of each second spatial direction sensor 103 can be calibrated to the coordinate system of the system 700.

In this embodiment, the first spatial direction sensor 102 can move from a first position A within the field of view FOV2 of a second spatial direction sensor to a position B in the field of view FOV3 of the third spatial direction sensor 113. Due to the fact that the second spatial direction sensors 103 and the third spatial direction sensor 113 are calibrated, the local coordinate system of the first spatial direction sensor 102 can be calibrated to the coordinate system of the system 700 in the positions A and B.

The reference points 111 may also be replaced by a probe 101 which is static and which remains in the fields of view FOV2, FOV3 of both the second spatial direction sensor 103 and the third spatial direction sensor 113.

Figure 8:
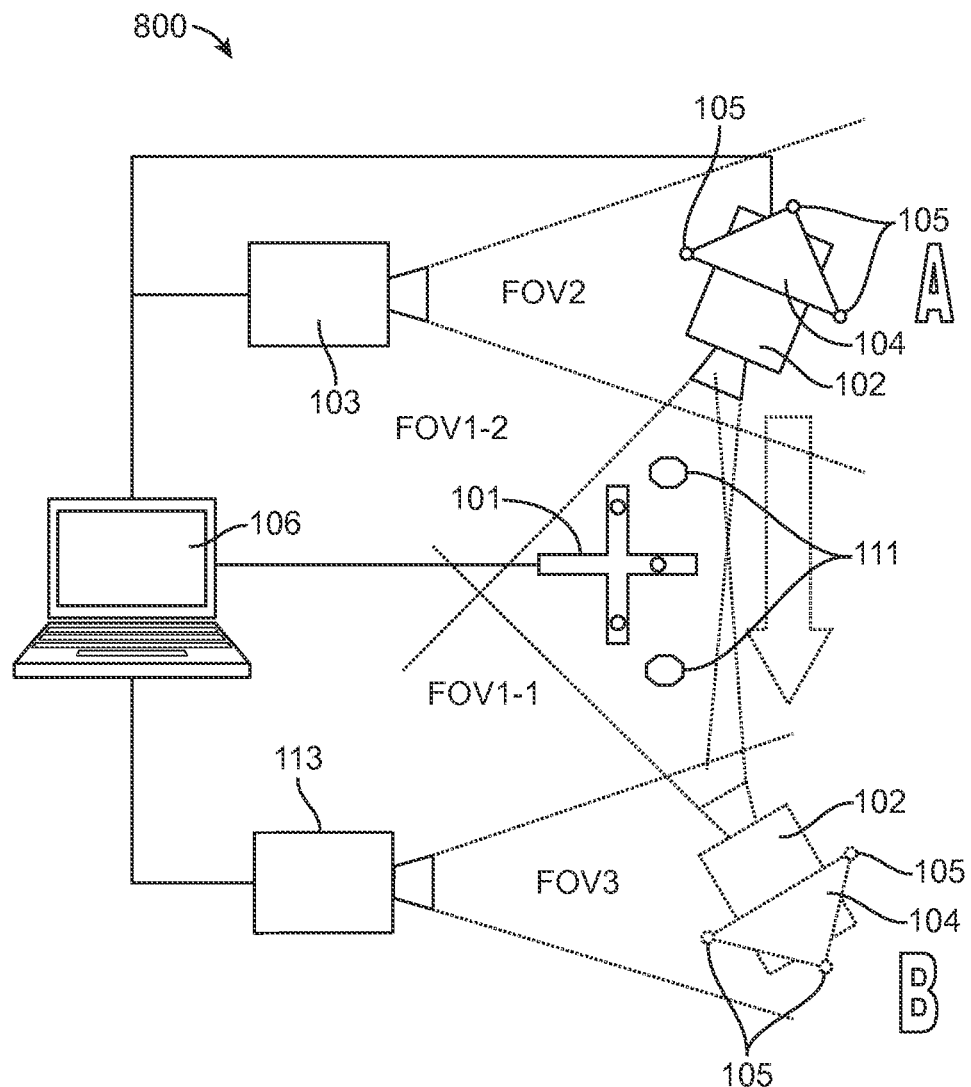
FIG. 8 illustrates a fifth embodiment of the present invention.

FIG. 8 refers to a fifth embodiment of the present invention. Again, the first spatial direction sensor 102 can be moved from a position A to a position B. Nevertheless, as in the fourth embodiment, the local coordinate system of the first direction sensor 102 stays calibrated with the coordinate system of the system 800. In contrast to the fourth embodiment, the system 800 is not calibrated by common reference points 111 or probes 101 in the fields of view FOV2 and FOV3 of the second spatial direction sensor 103 and the third spatial direction sensor 113. Instead, the first spatial direction sensor 102 determines the relative positions of the reference points 111 and/or a fixed probe 101 in its positions A and B. The reference points 111 and/or the fixed probes 101 are then in the fields of view of the first spatial direction sensor 102 before the movement from a first field of view of the first spatial direction sensor FOV1-1 to a second field of view of the first spatial direction sensor FOV1-2. From this measurement, the local coordinate systems of the second spatial direction sensor 103 and the third spatial direction sensor 113 are calibrated and the first spatial direction sensor 102 can perform measurements in the coordinate system of the system 800.

REFERENCE NUMERAL LIST

| System | 100, 400, 700, 800 |
|---|---|
| Probe | 101, 101-1, 101-2, 101-3 & 101-4 |
| First spatial direction sensor | 102 |
| Second spatial direction sensor | 103 |
| Thrid spatial direction sensor | 113 |
| Pattern of targets | 104 |
| Target | 105 |
| Processing means | 106 |
| Target of the probe | 107 |
| Object | 108 |
| Touch point | 109 |
| Frame structure | 110 |
| Reference point | 111 |
| Roof tooling of framing station | 201 |
| Side tooling of framing station | 202-1, 202-2 |
| Floor tooling of framing station | 203 |
| Touch point | 204 |
| Touch probe | 205 |
| Sheet-metal locating device | 206 |
| Spatial direction sensor | 207 |
| Side panel | 208-1, 209 |
| Roof panel | 210 |
| Floor assembly | 211 |
| Field of view of a first spatial direction sensor | FOV1 |
| Field of view of a second spatial direction sensor | FOV2 |
| Position before movement | A |
| Position after movement | B |

What is claimed is:

1. A system for measurement of spatial coordinates and/or orientation of a probe, comprising:
    a first spatial direction sensor associated with a pattern of targets with known positions relative to each other and to the first spatial direction sensor;
    said pattern of targets placed onto spatial direction sensor so that at least three targets are visible from any direction;
    a second spatial direction sensor;
    a probe with targets in known positions relative to each other;
    wherein at least three targets of the probe are in the field of view (FOV1) of the first spatial direction sensor; and
    processing means for the computation of
    the orientation and/or spatial coordinates of the pattern of targets of the first spatial direction sensor relative to the second spatial direction sensor based on the observation of at least three targets on the first spatial direction sensor by the second spatial direction sensor;
    the known positions of the targets of the first spatial direction sensor relative to each other and to the first spatial direction sensor; and
    a determination of the spatial directions of the targets observed on the first spatial direction sensor with respect to the second spatial direction sensor;
    and the computation of the orientation and/or spatial coordinates of the pattern of targets of the probe relative to the first spatial direction sensor based on the observation of at least three targets of the probe by the first spatial direction sensor;
    the known positions of the targets of the probe relative to each other and to the probe;
    a determination of the spatial directions of the targets observed on the probe with respect to the first spatial direction sensor;
    and the computation of the orientation and/or spatial coordinates of the probe relative to the second spatial direction sensor based on the relative orientations and/or coordinates between the second spatial direction sensor, the first spatial direction sensor and the probe established in the preceding steps.

2. A system for measurement of spatial coordinates of a probe according to claim 1, wherein the probe is aligned with an object so that determining the position and/or orientation of the probe also determines the spatial coordinates and/or orientation of the object.

3. A system for measurement of spatial coordinates of a probe according to claim 1, wherein the probe is a touch probe having a touch point and wherein the processing means is further configured to compute the spatial coordinates of the touch point from known positions of the at least three targets of the probe and the touch point relative to each other.

4. A system for measurement of spatial coordinates of a probe according to claim 1, wherein the first spatial direction sensor and the second spatial direction sensor are mechanically connected.

5. A system for measurement of spatial coordinates of a probe according to claim 1, comprising at least one further probe and/or at least one further first spatial direction sensor and/or at least one further second spatial direction sensor.

6. A system for measurement of spatial coordinates of a probe according to claim 5, wherein at least one reference point is in the fields of view (FOV1, FOV1') of the second spatial direction sensor and a further second spatial direction sensor; and wherein the processing means is further adapted to calibrate the spatial coordinate systems of the second spatial direction sensors based on the respective spatial coordinates of the at least one reference point.

7. A system for measurement of spatial coordinates of a probe according to claim 5, wherein the target moves from the field of view (FOV2) of the second spatial direction sensor in a field of view (FOV2') of a further second spatial direction sensor; wherein at least one reference point is in the fields of view (FOV1, FOV1') of the first spatial direction sensor before and after the movement; and wherein the processing means is further adapted to calibrate the spatial coordinate systems of the second spatial direction sensors based on the respective spatial coordinates of the at least one reference point.

8. A method for measurement of spatial coordinates of a probe, comprising:
- setting up a first spatial direction sensor associated with a pattern of targets with known positions relative to each other and to the first spatial direction sensor and configured to provide at least three observable targets from any direction;
- setting up a second spatial direction sensor;
- providing a probe with at least three targets with known positions relative to each other and to the probe;
  - orienting the probe so that the at least three targets of the probe are inside the field-of-view of the first spatial direction sensor
- observing the at least three targets of the probe from the first spatial direction sensor thereby determining the spatial directions from the first spatial direction sensor to said at least three targets of the probe;
- observing the at least three of the targets of the first spatial direction sensor from the second spatial direction sensor thereby determining the spatial directions from the second spatial direction sensor to said at least three targets of the first spatial direction sensor;
- computing the orientation of the pattern of targets of the first spatial direction sensor relative to the second spatial direction sensor based on the known positions of the targets relative to each other and the determined spatial directions of the targets; and
- computing the orientation of the pattern of targets of the probe relative to the first spatial direction sensor based on the known positions of the targets relative to each other and the determined spatial directions of the targets;
  - computing the orientation of the probe relative to the second spatial direction sensor based on the knowledge
  - wherein at least three targets are in the field of view (FOV2) of the second spatial direction sensor irrespective of the orientation of the pattern of targets.

9. A method for measurement of spatial coordinates of a probe according to claim 8, wherein the probe has targets with known positions relative to each other and wherein the determination of the spatial coordinates and/or orientation of the probe further comprises:
- determining the directions of the targets of the probe with respect to the first spatial direction sensor; and
- computing the spatial coordinates and/or orientation of the probe based on the known spatial coordinates and/or orientation of the first spatial direction sensor, the known positions of the targets of the probe relative to each other and the determined spatial directions of the targets of the probe with respect to the first spatial direction sensor;
- wherein at least three targets of the probe are in the field of view (FOV1) of the first spatial direction sensor.

10. A computer program providing program code to compute, when executed by a computer, the spatial coordinates and/or orientation of a probe based on known positions of targets of a pattern of targets associated with a first spatial direction sensor relative to each other and to the first spatial direction sensor and a determination of the spatial directions of the targets with respect to a second spatial direction sensor and to determine the spatial coordinates and/or orientation of the probe (101) with the first spatial direction sensor;
- wherein at least three targets are in the field of view (FOV2) of the second spatial direction sensor irrespective of the orientation of the pattern of targets.

11. A computer program according to claim 10, wherein the computation of the spatial coordinates and/or orientation of the probe is further based on the known spatial coordinates and/or orientation of the first spatial direction sensor, the known positions of targets of the probe relative to each other and a determination of the spatial directions of the targets of the probe with respect to the first spatial direction sensor;
- wherein at least three targets of the probe are in the field of view (FOV1) of the first spatial direction sensor.

* * * * *